United States Patent
Channel et al.

(10) Patent No.: US 11,434,766 B2
(45) Date of Patent: Sep. 6, 2022

(54) PROCESS FOR PRODUCING A NEAR NET SHAPE COMPONENT WITH CONSOLIDATION OF A METALLIC POWDER

(71) Applicant: GENERAL ELECTRIC COMPANY, Schenectady, NY (US)

(72) Inventors: Timothy Eden Channel, Simpsonville, SC (US); Gregory Keith Bouse, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1380 days.

(21) Appl. No.: 14/639,464

(22) Filed: Mar. 5, 2015

(65) Prior Publication Data
US 2016/0258298 A1 Sep. 8, 2016

(51) Int. Cl.
*B22F 5/04* (2006.01)
*B22F 5/10* (2006.01)
(Continued)

(52) U.S. Cl.
CPC .................. *F01D 5/18* (2013.01); *B22F 5/04* (2013.01); *B22F 5/10* (2013.01); *B22F 10/10* (2021.01);
(Continued)

(58) Field of Classification Search
CPC ...... B22F 3/15; B22F 2003/153; B22F 3/008; B22F 3/1055; B22F 3/1208; B22Y 10/00; B33Y 10/00
See application file for complete search history.

(56) References Cited

U.S. PATENT DOCUMENTS 3,982,934 A * 9/1976 Wentzell .................. B22F 3/04
419/8
4,329,175 A * 5/1982 Turner ...................... B22F 5/04
419/6
(Continued)

FOREIGN PATENT DOCUMENTS

CN       101391302 A  *  3/2009  ............ B22F 3/1055
CN       101391302 A       3/2009
(Continued)

OTHER PUBLICATIONS

Miracle. "Metal matrix composites—from science to technological significance". Composites Science and Technology 65 (2005) 2526-2540. (Year: 2005).*
(Continued)

*Primary Examiner* — Paul A Wartalowicz
*Assistant Examiner* — Stephani Hill
(74) *Attorney, Agent, or Firm* — McNees Wallace & Nurick LLC

(57) ABSTRACT

A process of producing an article and an article made are provided. The process includes producing a near-net shape component. The process includes forming a consolidation shell by additive manufacturing. The consolidation shell defines an interior space having a geometry corresponding to a component. A metallic powder is provided to the interior space. Gas is removed from the interior space. The metallic powder is consolidated in the consolidation shell under sufficient heat and pressure to form the near-net shape component.

17 Claims, 2 Drawing Sheets

(51) Int. Cl.

| | | |
|---|---|---|
| *B22F 10/10* | (2021.01) | |
| *B23P 15/02* | (2006.01) | |
| *F01D 5/18* | (2006.01) | |
| *F01D 5/22* | (2006.01) | |
| *F01D 9/02* | (2006.01) | |
| *F04D 29/32* | (2006.01) | |
| *F04D 29/54* | (2006.01) | |

(52) U.S. Cl.
 CPC ............... *F01D 5/225* (2013.01); *F01D 9/02* (2013.01); *F04D 29/324* (2013.01); *F04D 29/542* (2013.01); *B22F 2005/103* (2013.01); *B22F 2998/10* (2013.01); *B23P 15/02* (2013.01); *F05D 2220/32* (2013.01); *F05D 2240/35* (2013.01); *F05D 2260/20* (2013.01); *F05D 2300/502* (2013.01); *Y02P 10/25* (2015.11)

(56) References Cited

U.S. PATENT DOCUMENTS

| | | | | |
|---|---|---|---|---|
| 5,640,667 | A * | 6/1997 | Freitag | B22F 3/1055 419/31 |
| 6,454,811 | B1 * | 9/2002 | Sherwood | A61L 27/46 623/23.76 |
| 2004/0126266 | A1 * | 7/2004 | Jackson | B22F 5/10 419/66 |
| 2007/0003416 | A1 | 1/2007 | Bewlay et al. | |
| 2008/0115358 | A1 * | 5/2008 | Rice | C22C 19/03 29/889.21 |
| 2011/0052412 | A1 * | 3/2011 | Ader | B22F 3/1055 416/97 R |
| 2011/0106290 | A1 | 5/2011 | Hoevel et al. | |
| 2013/0228302 | A1 | 9/2013 | Rickenbacher et al. | |
| 2013/0263977 | A1 | 10/2013 | Rickenbacher et al. | |
| 2014/0053956 | A1 | 2/2014 | Etter et al. | |
| 2014/0163717 | A1 | 6/2014 | Das et al. | |
| 2015/0283614 | A1 * | 10/2015 | Wu | B22F 3/1055 419/42 |
| 2016/0243621 | A1 * | 8/2016 | Lucas | B22F 3/1258 |
| 2016/0333694 | A1 * | 11/2016 | Yoon | B22F 3/1055 |

FOREIGN PATENT DOCUMENTS

| | | | |
|---|---|---|---|
| CN | 103088275 A | | 5/2013 |
| EP | 2551040 A1 | | 1/2013 |
| JP | 4671910 B2 | | 4/2011 |
| KR | 2014 0115571 | * | 10/2014 |
| KR | 10-1473900 B1 | | 12/2014 |

OTHER PUBLICATIONS

CN 101391302 machine translation (Year: 2009).*

McQuarrie et al. "Table 10.8 Activity series for some common metals." General Chemistry (4th edition) 2011. p. 325. (Year: 2011).*

KR 2014 0115571 machine translation (Year: 2014).*

KR 2014 0115571 machine translation (Year: 2014) (This reference and the associated foreign publication were made of record Nov. 20, 2019.).*

Samal. "Corrosion resistance of powder metallurgy stainless steels." ASM Handbook, vol. 7, Powder Metallurgy, ASM International, 2015, 447-457. (Year: 2015).*

Benson, Tom. "Gas Turbine Parts". NASA Glenn Research Center. Oct. 1, 2004. https://www.grc.nasa.gov/www/k-12/VirtualAero/BottleRocket/airplane/turbparts.html. (Year: 2004).*

Mussman "Hot Isostatic Pressing." AZoM. Published Sep. 28, 2001. https://www.azom.com/article.aspx?ArticleID=924. (Year: 2001).*

Knight et al., "Metal Processing Using Selective Laser Sintering and Hot Isostatic Pressing (SLS/HIP)", Retrieved from the Internet: URL: http://sffsymposium.engr.utexas.edu/Manuscripts/1996/1996-42-Knight.pdf, Dec. 31, 1996.

Das et al., "Direct Laser Freeform Fabrication of High Performance Metal Components", Rapid Prototyping Journal, vol. No. 4, Issue No. 3, pp. 112-117, Jan. 1, 1998, ISSN: 1355-2546.

European Search Report and Written Opinion issued in connection with corresponding EP Application No. 16158426.3 dated Aug. 9, 2016.

Office Action issued in connection with corresponding EP Application No. 16158426.3 dated Jan. 2, 2018.

First Office Action and search issued in connection with corresponding CN Application No. 201610223630.4 dated Jan. 4, 2019.

* cited by examiner

PROCESS FOR PRODUCING A NEAR NET SHAPE COMPONENT WITH CONSOLIDATION OF A METALLIC POWDER

FIELD OF THE INVENTION

The present invention is directed to a process for producing an article and an article formed by the process. More specifically, the present invention is directed to a method for forming high temperature components having a fine grain structure.

BACKGROUND OF THE INVENTION

Turbine systems are continuously being modified to increase efficiency and decrease cost. One method for increasing the efficiency of a turbine system includes increasing the operating temperature of the turbine system. To increase the operating temperature of the turbine system, the individual components must be constructed to withstand the increased temperature.

In the past, high temperature articles for use with turbine systems have been formed by conventional forging techniques. The conventional forging techniques can be expensive, can only be performed by a few facilities, can result in unusable scrap material, and can be susceptible to cracking, oxidation, and/or contamination by foreign objects. In addition, high temperature alloys are prone to cracking during the forging process. which impacts process yield and final component cost.

Another known method for forming high temperature components is casting to near-net shape. However, near-net shape casting techniques result in coarse grain, non-uniform microstructures, and porosity defects, which impact mechanical properties and component capability.

Known powder metallurgical processes generally result in crude shapes where excessive machining and expense is required. Such powder metallurgical components require substantial secondary machining leading to excessive material waste.

A process and an article that show one or more improvements in comparison to the prior art would be desirable in the art.

BRIEF DESCRIPTION OF THE INVENTION

In one embodiment, a process of producing an article that includes producing a near net shape component. The process includes forming a consolidation shell by additive manufacturing. The consolidation shell defines an interior space having a geometry corresponding to a component. A metallic powder is provided to the interior space. Gas is removed from the interior space. The metallic powder is consolidated in the consolidation shell under sufficient heat and pressure to form the near net shape component.

In another embodiment, a consolidation shell includes an interior space having a geometry corresponding to a component. The consolidation shell further includes a conduit extending from the interior space. Metallic powder is present in the interior space.

In another embodiment, a component includes a consolidation shell formed by additive manufacturing. The consolidation shell defines an interior space having a geometry corresponding to the component. The interior space is at least partially filled with a consolidated powder.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are an article and a process for producing an article. Embodiments of the present disclosure, for example, in comparison to concepts failing to include one or more of the features disclosed herein, reduce manufacturing waste, reduce cycle time, permit formation of components having a uniform and fine grain microstructure, formation of components having high temperature operation, turbine operation with higher compressor ratios and efficiency, near net shape component formation, flexible designs, for example, for component cooling/fluid heating/lightweight designs, including complex geometries. In one embodiment, a component and consolidation shell may be formed of the same powder material, which reduces or eliminates dissimilar metal reaction zone, or a combination thereof. In one embodiment, the present disclosure is a modular process and desirably permits use as an automated/robotic manufacturing cell for gas turbine components. In one embodiment, accommodation of shrinkage rates that occur under densification permit formation of a net shape components with minimal or no machining. In this embodiment, the outer shell is made of the desired alloy of the component.

Figure 1:
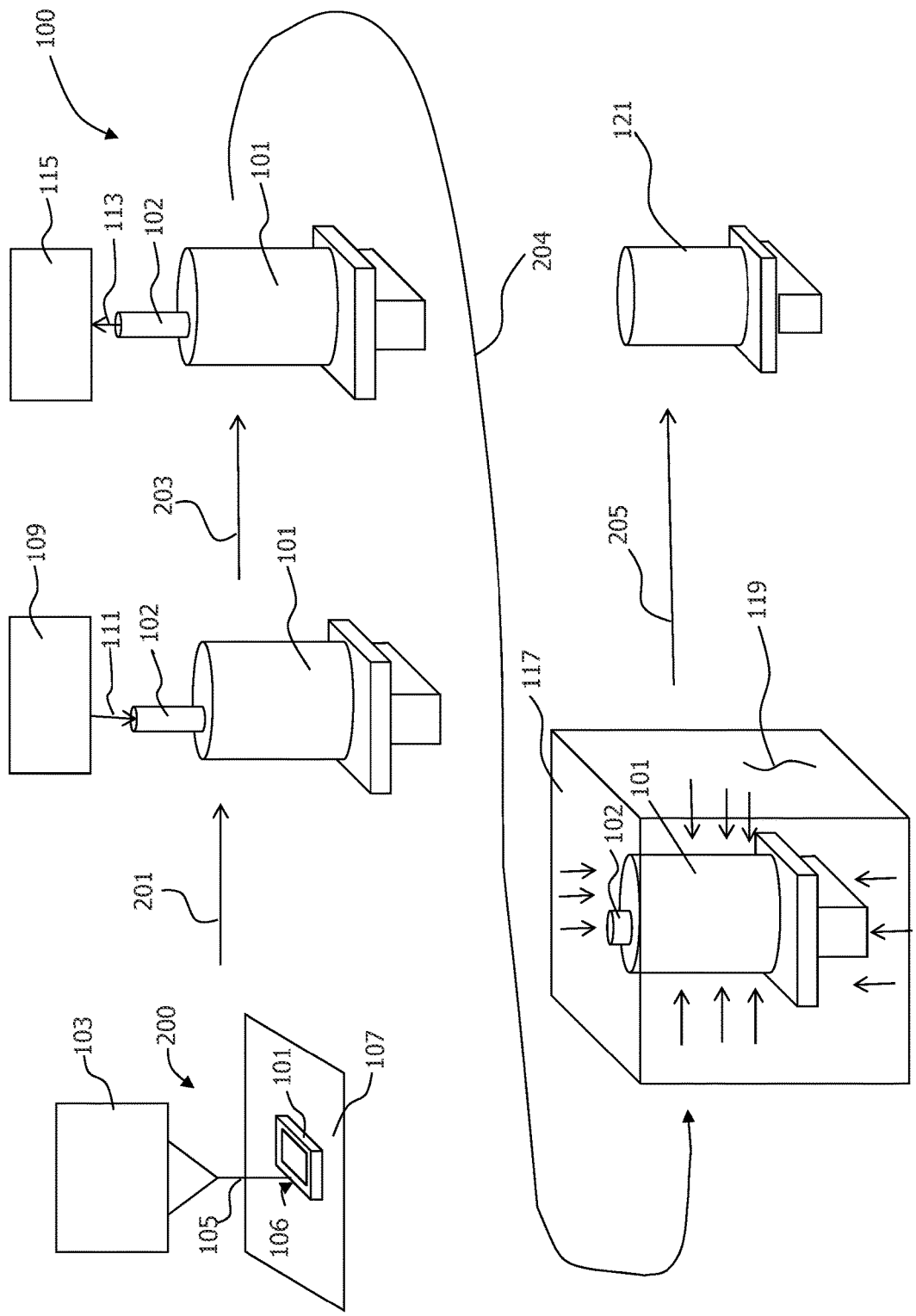
FIG. 1 is a schematic view of a process for producing and article, according to an embodiment of the disclosure.

As shown in FIG. 1, in step 200, in process 100, consolidation shell 101 is formed by an additive manufacturing process. The additive manufacturing technique forms a consolidation shell having an interior space having a geometry corresponding to the component near-net shape structures. As used herein "near-net shape" means that the component 121 is formed very close to the final shape of the component 121, not requiring significant traditional mechanical finishing techniques, such as machining or grinding, following the additive manufacturing. The additive manufacturing technique forms the consolidation shell 101 from any material suitable for use with the additive manufacturing technique. In one embodiment, the additive manufacturing technique includes, but is not limited to, the processes known to those of ordinary skill in the art as Direct Metal Laser Melting (DMLM), Direct Metal Laser Sintering (DMLS), Selective Laser Sintering (SLS), Selective Laser Melting (SLM), Electron Beam Melting (EBM), Fused Deposition Modeling (FDM), or a combination thereof.

In one embodiment, the additive manufacturing method is DMLS. The DMLS, as shown in FIG. 1, includes an energy source 103, such as a laser, that directs a high energy beam 105, toward a platform 107 having a powdered metal 106 that is sintered to form a solid. The energy source 103 and high energy beam 105 are moved and directed according to a computerized model or programmed path to form a solid component of controlled geometry. As shown in FIG. 1, the controlled geometry formed is a consolidation shell 101.

In another embodiment, the additive manufacturing process is DMLM and includes distributing a first layer of a material to a selected region, selectively laser melting the first layer, distributing at least one additional layer of the material over the first layer, and selectively laser melting each of the at least one additional layers. In this embodiment, the selective laser melting of the first layer and the at least one additional layer form the consolidation shell 101. In another embodiment, the material is an atomized powder. In a further embodiment, the DMLM is performed in an inert gas atmosphere. In one embodiment, the FDM includes supplying a material to a nozzle, heating the nozzle, and extruding the material through the nozzle. The heating of the nozzle melts the material as the material passes through the nozzle. Upon extrusion of the material through the nozzle the material hardens, forming the consolidation shell 101. Suitable materials for use in the additive manufacturing include, but are not limited to, a metal, a ceramic, an alloy, a superalloy, steel, a stainless steel, a tool steel, nickel, cobalt, chrome, titanium, aluminum, or a combination thereof. In one embodiment, the consolidation shell 101 of the component could be made of a material with a beneficial property, such as corrosion or oxidation resistance. For example, the consolidation shell 101 is made of a known corrosion and/or oxidation resistant composition to impart corrosion and/or oxidation resistance. Likewise, in another embodiment, if an erosion resistant property is desired, the consolidation shell 101 is made using an erosion-resistant shell.

In another embodiment, the consolidation shell 101 defines a component geometry that includes interior space or interior walls made of a second metal or alloy such as one that could be removed by physical or chemical means. For example, the second, removable material, such as a metal or alloy that is an active-series material such as magnesium or aluminum. The active-series material is a material, having a greater activity than the passive-series materials, such as a nickel-base material. In this embodiment, the active-series material could be leached or etched away from the component creating channels, for example, for fluid flow (gas or liquid), heating or cooling, or space for weight reduction.

Consolidation shell 101 includes a wall defining an interior space having a geometry corresponding to a component 121. The consolidation shell 101 is formed to include an interior space having a geometry corresponding to a desired component geometry. In one embodiment, the interior space includes a geometry that is the same as or is altered through processing to form a near-net shape component. For example, the consolidation shell geometry and dimensions would include an interior space that accounts for three dimension shrinkage that may occur during consolidation. A geometry corresponding to a desired component geometry is a geometry that results in the desired geometry of the component 121 after consolidation. In another embodiment, the geometry corresponding to a desired component includes a surface wherein the consolidation shell 101 is removed. In one embodiment, a plurality of consolidation shells 101 are joined together, for example, by welding, permitting simultaneous processing of multiple components.

The consolidation shell 101 formed by the additive manufacturing process includes a conduit 102 or similar structure extending from the interior space of the consolidation shell 101 and opening to an exterior space. The conduit 102 is formed with a geometry and in a location that permits filling of the consolidation shell 101 with powder and permits evacuation of gas. The conduit 102 is formed in a location with a geometry that reduces or eliminates the effect on the geometry of the component 121 after consolidation.

Once the consolidation shell 101 is formed, metallic powder 111 is provided to the consolidation shell 101 (step 201). In another embodiment, the metallic powder 111 may be introduced to the consolidation shell 101 during the formation of the consolidation shell 101 by the additive manufacturing process. The consolidation shell 101 is at least partially filled with metallic powder 111 from a metallic powder source 109. In one embodiment, metallic powder 111 is a fine grain powder. Suitable fine grain powder allows formation of a fine grain high strength alloy after consolidation. Suitable particle sizes for the metallic powder are for example, mesh size, and may range from about −80 to +325 mesh or from about −140 to +270 mesh. If the powder particles are too small, the flowability of the powder into the consolidation shell 101 is inhibited. If the powder particles are too large, the packing density of the powder is reduced and the grain size of the resultant component 121 may be undesirable. In one embodiment, the metallic powder 111 is a metal selected from the group consisting of nickel, cobalt, titanium, iron, alloys thereof and combinations thereof. In one embodiment, the consolidation shell 101 is filled with a metallic powder 111 of a single composition. In one embodiment, a portion of the consolidation shell 101 is partially filled with a metallic powder 111 of a first composition and the balance of the consolidation shell 101 is filled with a metallic powder 111 of a second composition wherein the first composition and the second composition have different properties. In another embodiment, the first composition and the second composition differ in particle size. In one embodiment, the properties of metallic powder 111 match the properties of the sections of the component 121. In one embodiment, the properties of the metallic powder 111 and the consolidation shell 101 are the same or substantially the same. For example, powder grain size of the metallic powder 111 can be tailored to the application of the component 121. In one embodiment, the grain size of the metallic powder is selected to provide desirable properties for the component 121. For example, the powder grain sizes selected provide mechanical properties and heat resistant properties necessary for use as a specific stationary or rotating gas turbine component. Examples of suitable grain sizes include an average grain size finer than ASTM 15 or from about ASTM 2 to ASTM 15 or finer than ASTM 3 or finer than ASTM 5 or finer than ASTM 8 or from about ASTM 8 to about ASTM 12, depending on the desired mechanical properties for the application. References throughout the present disclosure to ASTM grain sizes is in accordance with the standard scale established by the American Society for Testing and Materials.

Other materials for metallic powder 111 include, for example, a composition, by weight, of: about 10% nickel, about 29% chromium, about 7% tungsten, about 1% iron, about 0.25% carbon, about 0.01% boron, and balance cobalt (e.g., FSX414); about 0.015% boron, about 0.05% to about 0.15% carbon, about 20% to about 24% chromium, about 3% iron, about 0.02% to about 0.12% lanthium, about 1.25% manganese, about 20% to about 24% nickel, about 0.2% to about 0.5% silicon, about 13% to about 15% tungsten, and balance cobalt (e.g., HAYNES® 188); about 22.5% to about 24.25% chromium, up to about 0.3% titanium (e.g., about 0.15% to about 0.3% titanium), about 6.5% to about 7.5% tungsten, about 9% to about 11% nickel, about 3% to about 4% tantalum, up to about 0.65% carbon (e.g., about 0.55% to about 0.65% carbon), up to about 0.55% zirconium (e.g., about 0.45% to about 0.55% zirconium), and balance cobalt (e.g., Mar-M-509); about 0.05% carbon, about 20% nickel, about 20% chromium, about 0.1% zirconium, about 7.5% tantalum, and balance cobalt (e.g., Mar-M-918); about 6.6% to about 7.0% chromium, about 11.45% to about 12.05% cobalt, about 5.94% to about 6.30% aluminum, about 0.02% titanium, about 4.70% to about 5.10% tungsten, about 1.3% to about 1.7% molybdenum, about 2.6% to about 3.0% rhenium, about 6.20% to about 6.50% tantalum, about 1.3% to about 1.7% hafnium, about 0.10% to about 0.14% carbon, about 0.0035% manganese, about 0.03% zirconium, about 0.01% to about 0.02% boron, about 0.2% iron, about 0.06% silicon, about 0.1% potassium, about 0.004% sulfur, about 0.1% niobium, and balance nickel (e.g., Rene 142); about 13.70% to about 14.30% chromium, about 9% to about 10% cobalt, about 3.2% aluminum, about 4.8% to about 5.20% titanium, about 3.7% to about 4.3% tungsten, about 0.1% rhenium, up to about 4.3% rhenium and tungsten combined, about 0.5% tantalum, about 0.1% hafnium, about 0.15% to about 0.19% carbon, about 0.15% palladium, about 0.3% platinum, about 0.01% magnesium, about 0.02% to about 0.1% zirconium, about 0.01% to about 0.02% boron, about 0.35% iron, about 0.1% silicon, about 0.1% manganese, about 0.015% phosphorus, about 0.0075% sulfur, about 0.1% niobium, and balance nickel (e.g., Rene 80); about 0.08 to about 0.12% carbon, about 22.2% to about 22.8% chromium, about 0.10% manganese, about 0.25% silicon, about 18.5% to about 19.5% cobalt, about 1.8% to about 2.2% tungsten, about 2.3% titanium, about 1.2% aluminum, about 1.0% tantalum, about 0.8% niobium, about 0.05% zirconium, about 0.008% boron, and balance nickel (e.g., GTD-222®, available from General Electric Company); about 20% to about 24% chromium, about 10% to about 15% cobalt, about 8% to about 10% molybdenum, about 0.8% to about 1.5% aluminum, about 0.05% to about 0.15% carbon, about 3.0% iron, about 1.0% manganese, about 0.015% silicon, about 0.015% sulfur, about 0.6% titanium, about 0.5% copper, about 0.006% boron, and balance nickel (e.g., INCONEL® 617); about 5% iron, about 20% to about 23% chromium, up to about 0.5% silicon, about 8% to about 10% molybdenum, up to about 0.5% manganese, up to about 0.1% carbon, and balance nickel (e.g., INCONEL® 625); about 50% to about 55% nickel and cobalt combined, about 17% to about 21% chromium, about 4.75% to about 5.50% niobium and tantalum combined, about 0.08% carbon, about 0.35% manganese, about 0.35% silicon, about 0.015% phosphorus, about 0.015% sulfur, about 1.0% cobalt, about 0.35% to 0.80% aluminum, about 2.80% to about 3.30% molybdenum, about 0.65% to about 1.15% titanium, about 0.001% to about 0.006% boron, about 0.15% copper, and balance iron (e.g., INCONEL® 718); a martensitic stainless steel having a nominal composition, by weight percent, of 15.5% chromium, 6.3% nickel, 1.5% copper, 0.37% niobium (could be up to 0.4% niobium), 0.05% carbon, and balance iron (e.g., GTD-450 available from General Electric Company); about 0.15% carbon, about 1.00% manganese, about 0.50% silicon, between about 11.5% and about 13.0% chromium, about 0.04% phosphorus, about 0.03% sulfur, and the balance Fe (e.g., 403Cb); about 0.15% carbon, about 0.60% manganese, about 0.40% silicon, about 0.50% nickel, about 10.8% chromium, about 0.85% molybdenum, about 0.22% vanadium, about 0.39% niobium and the balance iron (e.g., 403Cb+); about 20% chromium, about 10% cobalt, about 8.5% molybdenum, up to about 2.5% titanium, about 1.5% aluminum, up to about 1.5% iron, up to about 0.3% manganese, up to about 0.15% silicon, about 0.06% carbon, about 0.005% boron, and balance nickel (e.g. HAYNES® 282); about 18% chromium, about 14.8% cobalt, about 3.0% molybdenum, about 1.25% tungsten, about 5% titanium, about 2.5% aluminum, about 0.035% carbon, about 0.033 boron, about 0.03 zirconium and balance nickel (e.g. UDIMET® 720). "INCONEL" is a federally registered trademark of alloys produced by Huntington Alloys Corporation, Huntington, W. Va. "HAYNES" is a federally registered trademark of alloys produced by Haynes International, Inc., Kokomo, Ind. "UDIMET" is a federally registered trademark of alloys produced by Special Metals Corporation, New Hartford, N.Y.

Gas 113 is then evacuated from the consolidation shell 101 (step 203). Removal of gas 113 or evacuation of the consolidation shell 101 may be accomplished by drawing a vacuum through conduit 102 via vacuum apparatus 115. In one embodiment, vacuum apparatus 115 includes a screen or filter having a mesh size sufficiently small to prevent the escape of powder during evacuation of the consolidation shell 101.

After gas has been removed from the consolidation shell 101, conduit 102 is sealed using any suitable means. For example, in one embodiment, the consolidation shell 101 is sealed by mechanically crimping conduit 102. In one embodiment, the conduit 102 is mechanically crimped, heated and TIG welded on the crimped end.

The consolidation shell 101 including the metallic powder 111 is then subjected to the step of consolidation for a time and at a temperature and pressure sufficient to densify the metal and/or alloy powder present in the consolidation shell 101. The time, temperature and pressure conditions for consolidation will necessarily vary depending on the alloy composition and characteristics of the powder including their melting point(s), powder type, particle size(s) and packing density. As shown in FIG. 1, in step 204, the consolidation shell 101 is provided to a high pressure containment vessel 117. The high pressure containment vessel 117 provides a controlled atmosphere 119 to consolidate the metallic powder 111 in consolidation shell 101. In one embodiment, consolidation is accomplished by hot isostatic pressing (HIP). HIP includes heat and pressure applied simultaneously in an inert atmosphere in the high pressure containment vessel 117. In one embodiment, the conditions for the consolidation include heating to about 2600 to about 3000° F. at pressure of from about 45 ksi to about 60 ksi. In another embodiment, it may be desirable to apply pressure to consolidation shell 101 and metallic powder 111 followed by a separate step of heating to sinter the powder particles. Conversely, it may also be desirable for some alloys to sinter, or partially sinter the metallic powder 111 followed by application of pressure to densify the metallic powder 111.

Consolidation results in near-net shape geometry component 121 (step 205). In one embodiment, the component 121 is machined to remove the conduit 102. In one embodiment, the consolidation shell 101 is removed from the component 121. In one embodiment, removal of the consolidation shell 101 is accomplished mechanically, for example by machining, utilizing known mechanical material removing methods. In one embodiment, removal of the consolidation shell 101 is accomplished chemically or electrically utilizing known material removing methods. Component 121 includes fine grain structure. For example, the microstructure of the component 121 includes a microstructure that provides desirable mechanical and heat resistant properties necessary, for example, for use as a specific stationary or rotating gas turbine component. For example, component 121 includes a grain size finer than ASTM 15 or from about ASTM 2 to ASTM 15 or finer than ASTM 3 or finer than ASTM 5 or finer than ASTM 8 or from about ASTM 8 to about ASTM 12.

In one embodiment, the process 100 is automated. In one embodiment, the steps shown in FIG. 1 are performed without manual handling. For example, the steps of process 100, in one embodiment, are performed in a single, evacuated vessel or atmosphere by automated equipment. The automated process reduces or eliminates the risk of contamination from atmospheric contaminants or manual handling. For example, metallic powder 111 in the evacuated vessel or atmosphere has reduced exposure to contamination and would result in a reduced risk of particle contamination in component 121.

Figure 3:
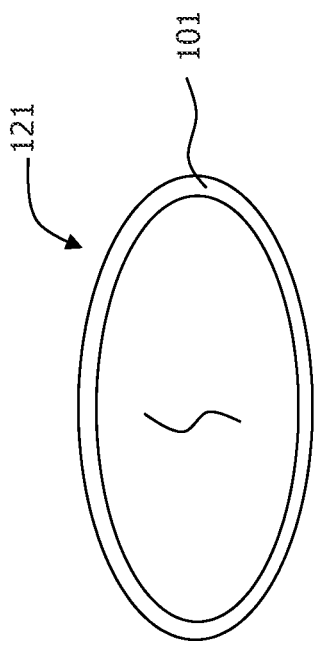
FIG. 3 is a sectional view of the component of FIG. 2 taken in direction 3-3, according to an embodiment of the disclosure.
Figure 4:
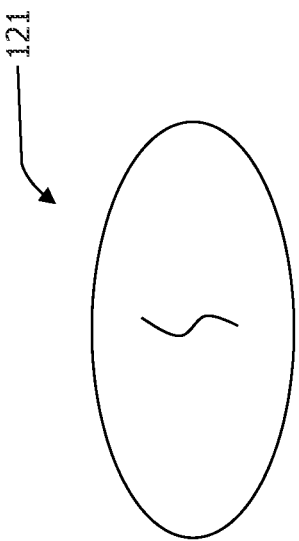
FIG. 4 is a sectional view of the component of FIG. 2 taken in direction 3-3, according to an embodiment of the disclosure.
Figure 2:
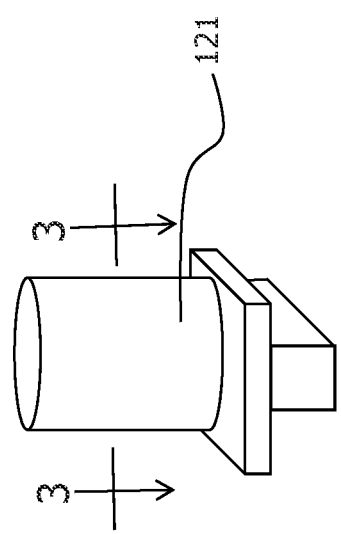
FIG. 2 is a perspective view of a component, according to an embodiment of the disclosure.

FIG. 3 shows a component 121, according to an embodiment of the disclosure. The component 121 is a near-net shape component having a geometry that is the same or substantially the same as the component in the operation. The component 121 shown in FIG. 3 is a turbine bucket, compressor blade or compressor vane. Other suitable components 121 include airfoil segments, nozzles, shrouds, combustion components, and/or any other suitable high temperature turbine component. FIG. 4 shows an embodiment showing a sectional view taken in direction 3-3 of FIG. 3, according to an embodiment. In this embodiment, component 121 includes consolidation 101. FIG. 5 shows an embodiment, showing a sectional view taken in direction 3-3 of FIG. 3 of an alternate embodiment wherein the consolidation shell 101 has been removed. Suitable removal processes include mechanical removal or other machining process.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A process of producing a near-net shape component, the process comprising:
   forming a consolidation shell by additive manufacturing, the consolidation shell defining an interior space having a geometry corresponding to a component;
   providing a metallic powder to the interior space;
   removing gas from the interior space; and
   consolidating the metallic powder in the consolidation shell under sufficient heat and pressure to form the near-net shape component,
   wherein the consolidation shell forms a coating material on the component, the coating material including a beneficial property relative to the consolidated metallic powder, the beneficial property being selected from the group consisting of corrosion resistance, oxidation resistance, erosion resistance, and combinations thereof.

2. The process of claim 1, wherein the consolidating includes hot isostatic pressing.

3. The process of claim 1, wherein the metallic powder includes metals selected from the group consisting of nickel, cobalt, titanium, iron, alloys thereof, and combinations thereof.

4. The process of claim 1, wherein the geometry corresponding to the component includes a geometry that forms the near-net shape component after consolidation.

5. The process of claim 1, wherein the near-net shape component is a gas turbine component selected from the group consisting of a compressor blade, a turbine bucket, a compressor vane, an airfoil segment, a nozzle, a shroud, and a combustion component.

6. The process of claim 5, wherein the gas turbine component is a compressor blade.

7. A process of producing a near-net shape component, the process comprising:
   forming a consolidation shell by additive manufacturing selected from the group consisting of direct metal laser sintering, direct metal laser melting, electron beam melting, and combinations thereof, the consolidation shell including a removable material, and defining an interior space having a geometry corresponding to a component;
   providing a metallic powder to the interior space;
   removing gas from the interior space;
   then sealing the consolidation shell; and
   then consolidating the metallic powder in the consolidation shell under sufficient heat and pressure to form the near-net shape component,
   wherein the consolidation shell forms a coating material on the near-net shape component, the coating material including a beneficial property relative to the consolidated metallic powder, the beneficial property being selected from the group consisting of corrosion resistance, oxidation resistance, erosion resistance, and combinations thereof,
   wherein the removable material is a metal or alloy including a material composition distinct from the metallic powder, and is removable to form channels in the component, and
   wherein the near-net shape component is a gas turbine component.

8. The process of claim 7, wherein the consolidating includes hot isostatic pressing.

9. The process of claim 7, wherein the metallic powder includes metals selected from the group consisting of nickel, cobalt, titanium, iron, alloys thereof, and combinations thereof.

10. The process of claim 7, wherein the gas turbine component is selected from the group consisting of a compressor blade, a turbine bucket, a compressor vane, an airfoil segment, a nozzle, a shroud, and a combustion component.

11. The process of claim 10, wherein the gas turbine component is a compressor blade.

12. The process of claim 7, wherein providing the metallic powder to the interior space includes providing a first metallic powder and a second metallic powder.

13. The process of claim 12, wherein the first metallic powder and the second metallic powder have dissimilar compositions.

14. The process of claim 12, wherein the first metallic powder and the second metallic powder have dissimilar properties.

15. The process of claim 7, further including leaching or etching the removable material away.

16. The process of claim 7, wherein the removable material has a greater activity with respect to at least one of leaching and etching than the metallic powder.

17. A process of producing a near-net shape component, the process comprising:
   forming, by additive manufacturing, a consolidation shell comprising a first and a second material, the consolidation shell defining an interior space having a geometry corresponding to a component;
   providing a metallic powder to the interior space;
   removing gas from the interior space;
   consolidating the metallic powder in the consolidation shell under sufficient heat and pressure to form the near-net shape component, wherein the near-net shape component is a compressor blade; and
   removing said second material by a physical or chemical means to form channels in the component,
   wherein the consolidation shell forms a coating material on the near-net shape component, the coating material including a beneficial property relative to the consolidated metallic powder, the beneficial property being selected from the group consisting of corrosion resistance, oxidation resistance, erosion resistance, and combinations thereof.

\* \* \* \* \*